United States Patent
Bailey et al.

(10) Patent No.: US 10,175,488 B2
(45) Date of Patent: Jan. 8, 2019

(54) SYSTEMS, DEVICES, AND METHODS FOR SPATIALLY-MULTIPLEXED HOLOGRAPHIC OPTICAL ELEMENTS

(71) Applicant: THALMIC LABS INC., Kitchener (CA)

(72) Inventors: Matthew Bailey, Kitchener (CA); Stefan Alexander, Elmira (CA); Vance R. Morrison, Kitchener (CA); Thomas Mahon, Guelph (CA); Lloyd Frederick Holland, Kitchener (CA); Jaehong Choi, Waterloo (CA)

(73) Assignee: NORTH INC., Kitchener (CA)

( * ) Notice: Subject to any disclaimer, the term of this patent is extended or adjusted under 35 U.S.C. 154(b) by 0 days.

(21) Appl. No.: 15/145,576

(22) Filed: May 3, 2016

(65) Prior Publication Data

US 2017/0212349 A1     Jul. 27, 2017

Related U.S. Application Data

(60) Provisional application No. 62/156,736, filed on May 4, 2015.

(51) Int. Cl.
*G02B 5/32*          (2006.01)
*G02B 27/01*         (2006.01)
(Continued)

(52) U.S. Cl.
CPC ....... *G02B 27/0172* (2013.01); *G02B 5/1876* (2013.01); *G02B 5/32* (2013.01);
(Continued)

(58) Field of Classification Search
CPC .............................. G03H 1/02; G02B 27/0093
(Continued)

(56) References Cited

U.S. PATENT DOCUMENTS

| 3,408,133 A | 10/1968 | Lee |
| 3,712,716 A | 1/1973 | Cornsweet et al. |

(Continued)

FOREIGN PATENT DOCUMENTS

| JP | 61-198892 A | 9/1986 |
| JP | 10-319240 A | 12/1998 |

(Continued)

OTHER PUBLICATIONS

International Search Report and Written Opinion dated Apr. 25, 2017 for corresponding International Application No. PCT/US2016/067246, 12 pages.

(Continued)

*Primary Examiner* — Audrey Y Chang
(74) *Attorney, Agent, or Firm* — Cozen O'Connor (57) ABSTRACT

Systems, devices, and methods for spatial multiplexing in holographic optical elements ("HOEs") are described. A spatially-multiplexed HOE includes multiple spatially-separated holographic regions and each spatially-separated region applies a respective optical function to light that is incident thereon. An exemplary application as a spatially-multiplexed holographic combiner ("SMHC") in a scanning laser-based wearable heads-up display ("WHUD") is described. In this exemplary application, a scanning laser projector directs multiple light signals over the area of the SMHC and the SMHC converges the light signals towards multiple spatially-separated exit pupils at or proximate the eye of the user. The particular exit pupil at the eye of the user towards which any particular light signal is converged by the SMHC depends on the particular region of the SMHC upon which the light signal is incident. Such may be useful in engineering particular eyebox and/or user interface display configurations in the operation of the WHUD.

20 Claims, 5 Drawing Sheets

(51) Int. Cl.
  *G03H 1/02* (2006.01)
  *G03H 1/26* (2006.01)
  *G02B 5/18* (2006.01)
  *G03H 1/22* (2006.01)
  *G02B 26/10* (2006.01)

(52) U.S. Cl.
  CPC ............ *G02B 26/10* (2013.01); *G02B 27/017* (2013.01); *G02B 27/0176* (2013.01); *G03H 1/0252* (2013.01); *G03H 1/2286* (2013.01); *G03H 1/265* (2013.01); *G03H 1/2645* (2013.01); *G02B 2027/015* (2013.01); *G02B 2027/0123* (2013.01); *G02B 2027/0125* (2013.01); *G02B 2027/0174* (2013.01); *G02B 2027/0178* (2013.01); *G03H 2001/2292* (2013.01); *G03H 2001/266* (2013.01)

(58) Field of Classification Search
  USPC .............................. 359/13, 15, 630; 345/7, 8
  See application file for complete search history.

(56) References Cited

U.S. PATENT DOCUMENTS

| | | | |
|---|---|---|---|
| 4,978,213 A | 12/1990 | El Hage | |
| 5,103,323 A | 4/1992 | Magarinos et al. | |
| 5,187,597 A * | 2/1993 | Kato | G02B 5/1876 359/13 |
| 5,231,674 A | 7/1993 | Cleveland et al. | |
| 5,467,104 A | 11/1995 | Furness, III et al. | |
| 5,589,956 A | 12/1996 | Morishima et al. | |
| 5,596,339 A | 1/1997 | Furness, III et al. | |
| 5,742,421 A | 4/1998 | Wells et al. | |
| 5,760,931 A | 6/1998 | Saburi et al. | |
| 6,008,781 A | 12/1999 | Furness, III et al. | |
| 6,027,216 A | 2/2000 | Guyton et al. | |
| 6,139,146 A | 10/2000 | Zhang | |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,353,503 B1 | 3/2002 | Spitzer et al. | |
| 6,377,277 B1 | 4/2002 | Yamamoto | |
| 6,545,778 B2 | 4/2003 | Ono et al. | |
| 6,639,570 B2 | 10/2003 | Furness, III et al. | |
| 6,972,734 B1 | 12/2005 | Ohshima et al. | |
| 7,473,888 B2 | 1/2009 | Wine et al. | |
| 7,640,007 B2 | 12/2009 | Chen et al. | |
| 7,684,105 B2 | 3/2010 | Lamontagne et al. | |
| 7,747,113 B2 | 6/2010 | Mukawa et al. | |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 7,927,522 B2 | 4/2011 | Hsu | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,355,671 B2 | 1/2013 | Kramer et al. | |
| 8,560,976 B1 | 10/2013 | Kim | |
| 8,634,119 B2 * | 1/2014 | Bablumyan | G03H 1/02 359/11 |
| 8,666,212 B1 | 3/2014 | Amirparviz | |
| 8,704,882 B2 | 4/2014 | Turner | |
| 8,922,481 B1 | 12/2014 | Kauffmann et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 2001/0033402 A1 | 10/2001 | Popovich | |
| 2002/0003627 A1 | 1/2002 | Rieder | |
| 2002/0007118 A1 | 1/2002 | Adachi et al. | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2004/0174287 A1 | 9/2004 | Deak | |
| 2005/0012715 A1 | 1/2005 | Ford | |
| 2006/0238707 A1 | 10/2006 | Elvesjo et al. | |
| 2007/0047038 A1 | 3/2007 | Takizawa | |
| 2007/0078308 A1 | 4/2007 | Daly | |
| 2007/0132785 A1 | 6/2007 | Ebersole, Jr. et al. | |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 | 3/2010 | Sugiyama et al. | |
| 2010/0142015 A1 | 6/2010 | Kuwahara et al. | |
| 2010/0149073 A1 * | 6/2010 | Chaum | G02B 27/0093 345/8 |
| 2010/0150415 A1 | 6/2010 | Atkinson et al. | |
| 2010/0239776 A1 | 9/2010 | Yajima et al. | |
| 2012/0002256 A1 | 1/2012 | Lacoste et al. | |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2012/0302289 A1 | 11/2012 | Kang | |
| 2013/0009853 A1 | 1/2013 | Hesselink et al. | |
| 2013/0016292 A1 | 1/2013 | Miao et al. | |
| 2013/0016413 A1 | 1/2013 | Saeedi et al. | |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 | 7/2014 | Yamaguchi | |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |
| 2015/0268821 A1 | 9/2015 | Ramsby et al. | |
| 2015/0325202 A1 | 11/2015 | Lake et al. | |
| 2015/0362734 A1 | 12/2015 | Moser et al. | |
| 2015/0378161 A1 | 12/2015 | Bailey et al. | |
| 2015/0378162 A1 | 12/2015 | Bailey et al. | |
| 2015/0378164 A1 | 12/2015 | Bailey et al. | |
| 2016/0033771 A1 | 2/2016 | Tremblay et al. | |
| 2016/0154244 A1 | 6/2016 | Border et al. | |
| 2016/0202081 A1 | 7/2016 | Debieuvre et al. | |
| 2016/0238845 A1 | 8/2016 | Alexander et al. | |
| 2016/0246384 A1 | 8/2016 | Mullins et al. | |
| 2016/0274365 A1 | 9/2016 | Bailey et al. | |
| 2016/0274758 A1 | 9/2016 | Bailey | |
| 2016/0313899 A1 | 10/2016 | Noel | |
| 2016/0327796 A1 | 11/2016 | Bailey et al. | |
| 2016/0327797 A1 | 11/2016 | Bailey et al. | |
| 2016/0349514 A1 | 12/2016 | Alexander et al. | |
| 2016/0349515 A1 | 12/2016 | Alexander et al. | |
| 2016/0349516 A1 | 12/2016 | Alexander et al. | |
| 2016/0377865 A1 | 12/2016 | Alexander et al. | |
| 2016/0377866 A1 | 12/2016 | Alexander et al. | |
| 2017/0068095 A1 | 3/2017 | Holland et al. | |

(56) References Cited

U.S. PATENT DOCUMENTS

| | | | |
|---|---|---|---|
| 2017/0097753 | A1 | 4/2017 | Bailey et al. |
| 2017/0115483 | A1 | 4/2017 | Aleem et al. |
| 2017/0153701 | A1 | 6/2017 | Mahon et al. |
| 2017/0205876 | A1 | 7/2017 | Vidal et al. |
| 2017/0212290 | A1 | 7/2017 | Alexander et al. |
| 2017/0219829 | A1 | 8/2017 | Bailey |
| 2017/0299956 | A1 | 10/2017 | Holland et al. |
| 2017/0343796 | A1 | 11/2017 | Bailey et al. |
| 2017/0343797 | A1 | 11/2017 | Bailey et al. |
| 2018/0007255 | A1 | 1/2018 | Tang |
| 2018/0035087 | A1 | 2/2018 | Xu |
| 2018/0045955 | A1 | 2/2018 | Alexander et al. |
| 2018/0129052 | A1 | 5/2018 | Morrison |
| 2018/0129057 | A1 | 5/2018 | Morrison et al. |
| 2018/0129058 | A1 | 5/2018 | Morrison et al. |

FOREIGN PATENT DOCUMENTS

| | | | |
|---|---|---|---|
| JP | 2013-127489 | A | 6/2013 |
| JP | 2013-160905 | A | 8/2013 |
| KR | 10-2004-0006609 | A | 1/2004 |
| WO | 2014/155288 | A2 | 10/2014 |
| WO | 2015/123775 | A1 | 8/2015 |

OTHER PUBLICATIONS

Amitai, "P-27: A Two-Dimensional Aperture Expander for Ultra-Compact, High-Performance Head-Worn Displays," *SID Symposium Digest of Technical Papers 36*(1):360-363, 2005.

Äyräs et al., "Exit pupil expander with a large field of view based on diffractive optics," *Journal of the SID 17*(8):659-664, 2009.

Chellappan et al., "Laser-based displays: a review," *Applied Optics 49*(25):F79-F98, 2010.

Cui et al., "Diffraction from angular multiplexing slanted volume hologram gratings," *Optik 116*:118-122, 2005.

Curatu et al., "Dual Purpose Lens for an Eye-Tracked Projection Head-Mounted Display," International Optical Design Conference 2006, *SPIE-OSA 6342*:63420X-1-63420X-7, 2007.

Curatu et al., "Projection-based head-mounted display with eye-tracking capabilities," *Proc. of SPIE 5875*:58750J-1-58750J-9, 2005.

Essex, "Tutorial on Optomechanical Beam Steering Mechanisms," OPTI 521 Tutorial, College of Optical Sciences, University of Arizona, 8 pages, 2006.

Fernández et al., "Optimization of a thick polyvinyl alcohol-acrylamide photopolymer for data storage using a combination of angular and peristrophic holographic multiplexing," *Applied Optics 45*(29):7661-7666, 2009.

Hainich et al., "Chapter 10: Near-Eye Displays," *Displays: Fundamentals & Applications*, AK Peters/CRC Press, 2011, 65 pages.

Hornstein et al., "Maradin's Micro-Mirror—System Level Synchronization Notes," SID 2012 Digest, pp. 981-984.

International Search Report, dated Jun. 8, 2016, for PCT/US2016/018293, 17 pages.

International Search Report, dated Jun. 8, 2016, for PCT/US2016/018298, 14 pages.

International Search Report, dated Jun. 8, 2016, for PCT/US2016/018299, 12 pages.

Itoh et al., "Interaction-Free Calibration for Optical See-Through Head-Mounted Displays based on 3D Eye Localization," 2014 IEEE Symposium on 3D User Interfaces (3DUI), pp. 75-82, 2014.

Kessler, "Optics of Near to Eye Displays (NEDs)," Presentation—Oasis 2013, Tel Aviv, Feb. 19, 2013, 37 pages.

Kress et al., "A review of head-mounted displays (HMD) technologies and applications for consumer electronics," *Proc. of SPIE 8720*:87200A-1-87200A-13, 2013.

Kress et al., " Diffractive and Holographic Optics as Optical Combiners in Head Mounted Displays," Proceedings of the 2013 ACM Conference on Pervasive and Ubiquitous Computing Adjunct Publication, pp. 1479-1482, 2013.

Kress, "Optical architectures for see-through wearable displays," Presentation—Bay Area—SID Seminar, Apr. 30, 2014, 156 pages.

Levola, "7.1: *Invited Paper*: Novel Diffractive Optical Components for Near to Eye Displays," *SID Symposium Digest of Technical Papers 37*(1):64-67, 2006.

Liao et al., "The Evolution of MEMS Displays," *IEEE Transactions on Industrial Electronics 56*(4):1057-1065, 2009.

Lippert, "Chapter 6: Display Devices: RSD™ (Retinal Scanning Display)," *The Avionics Handbook*, CRC Press, 2001, 8 pages.

Majaranta et al., "Chapter 3—Eye-Tracking and Eye-Based Human-Computer Interaction," in *Advances in Physiological Computing*, Springer-Verlag London, 2014, pp. 17-39.

Schowengerdt et al., "Stereoscopic retinal scanning laser display with integrated focus cues for ocular accommodation" *Proc. of SPIE-IS&T Electronic Imaging 5291*:366-376, 2004.

Silverman et al., "58.5L: *Late—News Paper*: Engineering a Retinal Scanning Laser Display with Integrated Accommodative Depth Cues," SID 03 Digest, pp. 1538-1541, 2003.

Takatsuka et al., "Retinal projection display using diffractive optical element," Tenth International Conference on Intelligent Information Hiding and Multimedia Signal Processing, IEEE, 2014, pp. 403-406.

Urey et al., "Optical performance requirements for MEMS-scanner based microdisplays," Conf. on MOEMS and Miniaturized Systems, *SPIE 4178*:176-185, 2000.

Urey, "Diffractive exit-pupil expander for display applications," *Applied Optics 40*(32):5840-5851, 2001.

Viirre et al., "The Virtual Retinal Display: A New Technology for Virtual Reality and Augmented Vision in Medicine," *Proc. of Medicine Meets Virtual Reality*, IOS Press and Ohmsha, 1998, pp. 252-257. (6 pages).

International Search Report and Written Opinion, dated Dec. 8, 2016, for International Application No. PCT/US2016/050225, 15 pages.

International Search Report and Written Opinion, dated Jan. 18, 2017, for International Application No. PCT/US2016/054852, 12 pages.

International Search Report and Written Opinion, dated Oct. 13, 2017, for International Application No. PCT/US2017/040323, 16 pages.

International Search Report and Written Opinion, dated Sep. 28, 2017, for International Application No. PCT/US2017/027479, 13 pages.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Merriam-Webster, "Radio Frequencies" retrieved from https://www.merriam-webster.com/table/collegiate/radiofre.htm, retrieved on Jul. 12, 2017, 2 pages.

\* cited by examiner

SYSTEMS, DEVICES, AND METHODS FOR SPATIALLY-MULTIPLEXED HOLOGRAPHIC OPTICAL ELEMENTS

BACKGROUND

Technical Field

The present systems, devices, and methods generally relate to multiplexing in holographic optical elements and particularly relate to using spatial multiplexing to engineer the eyebox and/or user interface of a scanning laser-based wearable heads-up display.

Description of the Related Art

Holographic Optical Elements

For the purposes of the present systems, devices, and methods, a holographic optical element is an optical element that includes at least one hologram. Generally, a holographic optical element comprises one or more layer(s) of holographic material with at least one hologram recorded, embedded, stored, or carried (collectively, "included") therein or thereon. A holographic optical element may be a film and/or laminate structure comprising any number of layers and any number of holograms per layer, depending on the specific application.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content/imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

A spatially-multiplexed holographic optical element ("HOE") for use in a display having multiple exit pupils may be summarized as including at least one layer of holographic material that comprises: a first holographic region to receive light from a light source, apply a first optical function thereto, and direct the light towards a first exit pupil with the first optical function applied thereto; and a second holographic region to receive light from the light source, apply a second optical function thereto, and direct the light towards a second exit pupil with the second optical function applied thereto, wherein: the second holographic region is spatially-separated from the first holographic region; and the second exit pupil is spatially-separated from the first exit pupil.

The first optical function may converge the light towards the first exit pupil and the second optical function may converge the light towards the second exit pupil. The first optical function may converge the light towards the first exit pupil with a first rate of convergence and the second optical function may converge the light towards the second exit pupil with a second rate of convergence, the second rate of convergence different from the first rate of convergence.

Both the first optical function and the second optical function may reflect the light from the light source. The first optical function may converge the light towards the first exit pupil and the second optical function may diverge the light towards the second exit pupil.

The first holographic region may include a first hologram and the second holographic region may include a second hologram. The at least one layer of holographic material may comprise a first continuous piece of holographic material that includes both the first holographic region and the second holographic region, where the first hologram may be in the first holographic region of the first continuous piece of holographic material and the second hologram may be in the second holographic region of the first continuous piece of holographic material. Alternatively, the at least one layer of holographic material may comprise: a first piece of holographic material that includes the first holographic region, where the first hologram is in the first holographic region of the first piece of holographic material; and a second piece of holographic material that includes the second holographic region, where the second hologram is in the second holographic region of the second piece of holographic material. The spatially-multiplexed HOE may further include a substrate layer that carries both the first piece of holographic material and the second piece of holographic material.

The at least one layer of holographic material may include a holographic material selected from a group consisting of: a holographic film, a silver halide compound, and a photopolymer. The at least one layer of holographic material may further include: at least one additional holographic region to receive light from the light source, each additional holographic region to apply a respective optical function to light received from the light source and direct the light towards a respective exit pupil, wherein: each additional holographic region is spatially-separated from the other holographic regions; and each exit pupil is spatially-separated from the other exit pupils. The first holographic region and the second holographic region may both be substantially transparent to visible light having a wavelength that is not a wavelength of light provided by the light source.

A wearable heads-up display ("WHUD") may be summarized as including: a support structure that in use is worn on a head of a user; a scanning laser projector carried by the support structure; and a spatially-multiplexed holographic combiner carried by the support structure, wherein the spatially-multiplexed holographic combiner is positioned within a field of view of an eye of the user when the support structure is worn on the head of the user, and wherein the spatially-multiplexed holographic combiner comprises at least one layer of holographic material, the at least one layer of holographic material including: a first holographic region positioned and oriented to receive a first range of light signals from the scanning laser projector and to converge the first range of light signals to a first exit pupil at or proximate the eye of the user; and a second holographic region positioned and oriented to receive a second range of light signals from the scanning laser projector and to converge the second range of light signals to a second exit pupil at or proximate the eye of the user, wherein the second holographic region is spatially-separated from the first holographic region at the spatially-multiplexed holographic combiner and the second exit pupil is spatially-separated from the first exit pupil at the eye of the user. The support structure may have a general shape and appearance of an eyeglasses frame, and the spatially-multiplexed holographic combiner may further include an eyeglass lens that carries the at least one layer of holographic material.

The first holographic region of the spatially-multiplexed holographic combiner may include a first hologram and the second holographic region of the spatially-multiplexed holographic combiner may include a second hologram. The at least one layer of holographic material in the spatially-multiplexed holographic combiner may comprise a first continuous piece of holographic material that includes both the first holographic region and the second holographic region, where the first hologram may be in the first holographic region of the first continuous piece of holographic material and the second hologram may be in the second holographic region of the first continuous piece of holographic material. Alternatively, the at least one layer of holographic material in the spatially-multiplexed holographic combiner may comprise: a first piece of holographic material that includes the first holographic region, where the first hologram is in the first holographic region of the first piece of holographic material; and a second piece of holographic material that includes the second holographic region, where the second hologram is in the second holographic region of the second piece of holographic material.

The at least one layer of holographic material in the spatially-multiplexed holographic combiner may further include: at least one additional holographic region, each additional holographic region positioned and oriented to receive a respective range of light signals from the scanning laser projector and to converge the respective range of light signals to a respective exit pupil at or proximate the eye of the user, wherein each additional holographic region is spatially-separated from the other holographic regions at the spatially-multiplexed holographic combiner and each respective exit pupil is spatially-separated from the other exit pupils at the eye of the user.

A method of operating a WHUD, the WHUD including a scanning laser projector and a spatially-multiplexed holographic combiner positioned within a field of view of an eye of a user when the WHUD is worn on a head of the user, may be summarized as including: directing a first light signal towards a first region of the spatially-multiplexed holographic combiner by the scanning laser projector; redirecting, by the first region of the spatially-multiplexed holographic combiner, the first light signal towards a first exit pupil at or proximate the eye of the user; directing a second light signal towards a second region of the spatially-multiplexed holographic combiner by the scanning laser projector, the second region of the spatially-multiplexed holographic combiner spatially separated from the first region of the spatially-multiplexed holographic combiner at the spatially-multiplexed holographic combiner; and redirecting, by the second region of the spatially-multiplexed holographic combiner, the second light signal towards a second exit pupil at or proximate the eye of the user, the second exit pupil spatially-separated from the first exit pupil at the eye of the user. Redirecting, by the first region of the spatially-multiplexed holographic combiner, the first light signal towards a first exit pupil at or proximate the eye of the user may include converging, by the first region of the spatially-multiplexed holographic combiner, the first light signal towards the first exit pupil at or proximate the eye of the user. Redirecting, by the second region of the spatially-multiplexed holographic combiner, the second light signal towards a second exit pupil at or proximate the eye of the user may include converging, by the second region of the spatially-multiplexed holographic combiner, the second light signal towards the second exit pupil at or proximate the eye of the user. The method may further include: directing at least one additional light signal towards the spatially-multiplexed holographic combiner by the scanning laser projector, each additional light signal being directed towards a respective spatially-separated region of the spatially-multiplexed holographic combiner by the scanning laser projector; and redirecting, by each respective spatially-separated region of the spatially-multiplexed holographic combiner, each additional light signal towards a respective a respective spatially-separated exit pupil at or proximate the eye of the user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for spatial multiplexing in holographic optical elements ("HOEs"). Spatial multiplexing is a new form of multiplexing by which an HOE applies a different optical function to light that is incident thereon depending on the particular spot, region, or area of the HOE upon which the light is incident. For example, an HOE that implements spatial multiplexing as described herein may include at least two spatially-separated holographic regions, where a first holographic region applies a first optical function to light that is incident thereon and a second holographic region applies a second optical function to light that is incident thereon. In this way, a set of light signals incident on the HOE may be engineered to encode multiple different images, pixels, or other data (i.e., multiplexed) and the physical spot, area, or region of the HOE upon which each light signal is incident may be used to separate out the different images, pixels, or other data. Spatial multiplexing may be useful in a wide range of applications and is particularly well-suited for use in certain architectures of wearable heads-up displays ("WHUDs"), such as scanning laser-based WHUDs.

Generally, a scanning laser-based WHUD is a form of virtual retina display in which a scanning laser projector ("SLP") draws a raster scan onto the eye of the user. In the absence of any further measure the SLP projects light over a fixed area called the exit pupil of the display. In order for the user to see displayed content the exit pupil typically needs to align with, be encompassed by, or overlap with the entrance pupil of the user's eye. The full resolution and/or field of view of the display is visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead but the eye's pupil may quickly leave the eyebox if and when the user glances anywhere off-center. A larger eyebox may be achieved by increasing the size of the exit pupil but this typically comes at the cost of reducing the display resolution and/or field of view.

Various examples of scanning laser-based WHUDs are described in, at least, U.S. Non-Provisional patent application Ser. No. 15/046,234, U.S. Non-Provisional patent application Ser. No. 15/046,254, and U.S. Non-Provisional patent application Ser. No. 15/046,269, each of which includes a holographic combiner positioned in the field of view of at least one of the user to receive light from the SLP and redirect (e.g., converge) the light towards the eye of the user. In accordance with the present systems, devices, and methods, spatial multiplexing of such a holographic combiner may be used to produce multiple exit pupils at or proximate the eye of the user and thereby expand the eyebox of the scanning laser-based WHUD. In some implementations, each respective exit pupil may correspond to an optically replicated or repeated instance of a relatively small exit pupil, and spatially distributing the multiple instances of the exit pupil over a relatively larger area of the user's eye may produce an expanded eyebox, compared to the area of the single exit pupil on its own. In this way, at least one complete instance of the display exit pupil (either as a single instance in its entirety or as a combination of respective portions of multiple instances) may be contained within the perimeter of the eye's pupil for each of a range of eye positions corresponding to a range of gaze directions of the user. In other words, certain applications of the present systems, devices, and methods enable eyebox expansion by exit pupil replication in scanning laser-based WHUDs.

Throughout this specification and the appended claims, the term "replication" is used (e.g., in the context of "exit pupil replication") to generally refer to situations where multiple instances of substantially the same thing (e.g., an exit pupil) are produced. The term "exit pupil replication" is intended to generally encompass approaches that produce concurrent (e.g., temporally parallel) instances of an exit pupil as well as approaches that produce sequential (e.g., temporally serial or "repeated") instances of an exit pupil. In many examples, the present systems, devices, and methods provide exit pupil replication by exit pupil repetition or sequential exit pupil tiling. Unless the specific context requires otherwise, references to "exit pupil replication" herein include exit pupil replication by exit pupil repetition.

Exit pupil replication is an example of an application of spatial multiplexing in a scanning laser-based WHUD; however, spatial multiplexing may also be used to (either instead of or in addition to replicate exit pupils) provide a particular user interface and/or display configuration. In exit pupil replication, each exit pupil corresponds to a respective spatially-separated instance of substantially the same projected content at or proximate the eye of the user. Such can certainly be advantageous, but in some applications spatial multiplexing may be used to provide different projected content to different regions of the user's eye and/or field of view. For example, spatial multiplexing may be used to provide a first image to a first exit pupil projected at a first position/location at or on the user's eye corresponding to a first position/location in the user's field of view and a second image to a second exit pupil projected at a second position/location at or on the user's eye corresponding to a second position/location in the user's field of view.

Figure 1:
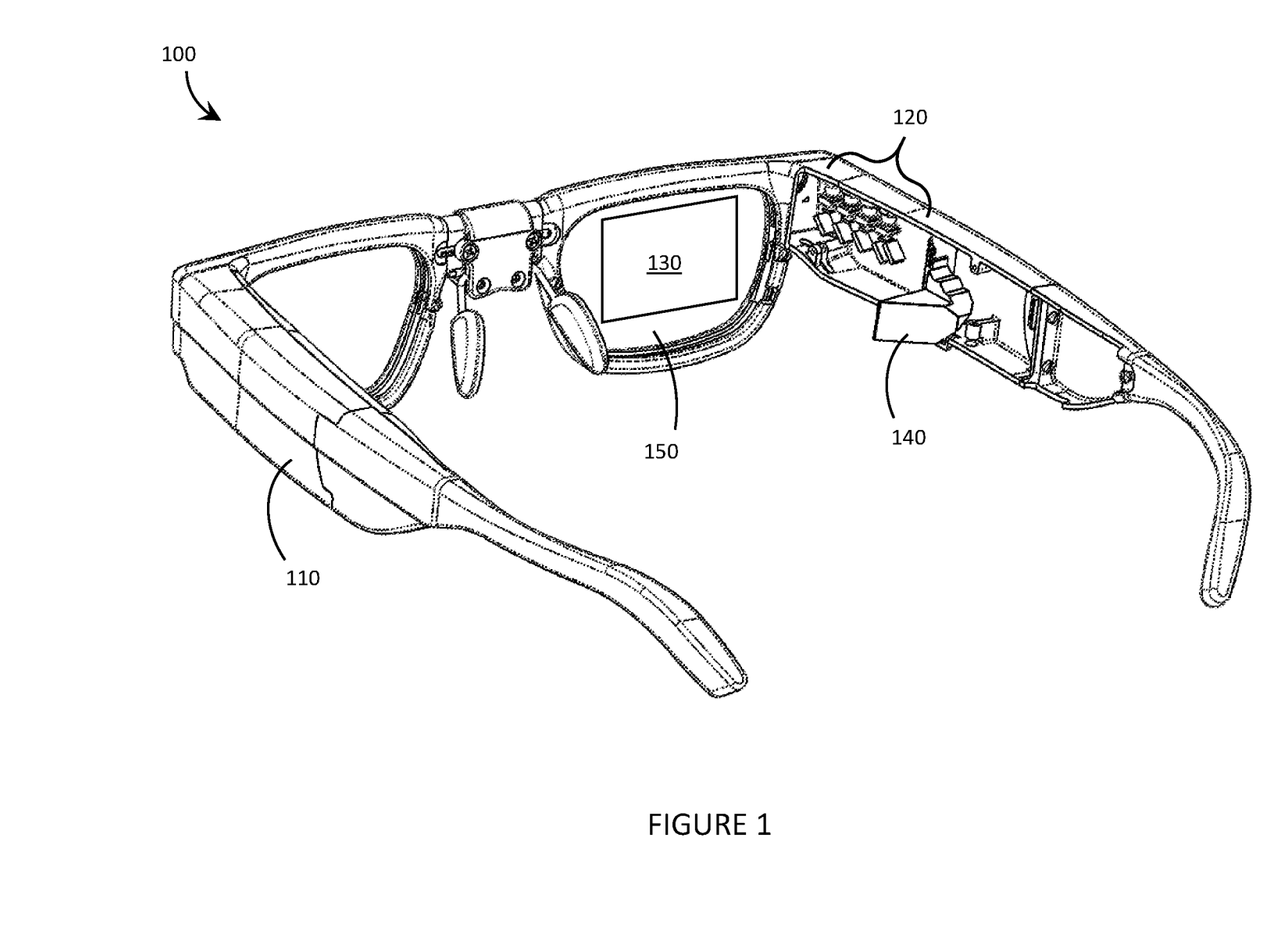
FIG. 1 is a partial-cutaway perspective view of a wearable heads-up display that implements spatial multiplexing to project multiple exit pupils in accordance with the present systems, devices, and methods.

FIG. 1 is a partial-cutaway perspective view of a WHUD 100 that implements spatial multiplexing to project multiple exit pupils in accordance with the present systems, devices, and methods. WHUD 100 includes a support structure 110 that in use is worn on the head of a user and has a general shape and appearance of an eyeglasses (e.g., sunglasses) frame. Support structure 110 carries multiple components, including: a SLP 120, a spatially-multiplexed holographic combiner ("SMHC") 130, and an optic 140 for routing light signals from SLP 120 to SMHC 130. Portions of SLP 120 and optic 140 may be contained within an inner volume of support structure 110; however, FIG. 1 provides a partial-cutaway view in which regions of support structure 110 have been removed in order to render visible portions of SLP 120 and optic 140 that may otherwise be concealed.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects therebetween.

SLP 120 may include multiple laser diodes (e.g., a red laser diode, a green laser diode, and/or a blue laser diode) and at least one scan mirror (e.g., a single two-dimensional scan mirror or two one-dimensional scan mirrors, which may be, e.g., MEMS-based or piezo-based). SLP 120 may be communicatively coupled to (and support structure 110 may further carry) a processor and a non-transitory processor-readable storage medium or memory storing processor-executable data and/or instructions that, when executed by the processor, cause the processor to control the operation of SLP 120. For ease of illustration, FIG. 1 does not call out a processor or a memory. In some implementations, SLP 120 may employ the systems, devices, and methods for focusing laser projectors described in U.S. Provisional Patent Application Ser. No. 62/322,128.

Optic 140 may perform a variety of different roles or may not be included at all depending on the specific implementation. For example, in some applications optic 140 may be a form of eyebox expansion optic such as any of those described in U.S. Non-Provisional patent application Ser. No. 15/046,234, U.S. Non-Provisional patent application Ser. No. 15/046,254, and U.S. Non-Provisional patent application Ser. No. 15/046,269. In the illustrated implementation of WHUD 100, SLP 120 is oriented to initially project light towards the ear of the user and optic 140 is used to re-route the projected light back towards SMHC 130. This configuration is used in WHUD 100 to influence/accommodate the form factor of support structure 110 and to provide a desired path length for the optical path of laser light projected from SLP 120 to SMHC 130, but alternative WHUD implementations may have different requirements and may or may not include an optic such as optic 140.

SMHC 130 is a spatially-multiplexed HOE in accordance with the present systems, device, and methods and is positioned within a field of view of at least one eye of the user when support structure 110 is worn on the head of the user. SMHC 130 is sufficiently optically transparent to wavelengths other than the wavelengths of laser light provided by SLP 120 in order to permit light from the user's environment (i.e., "environmental light") to pass through to the user's eye. In the illustrated example of FIG. 1, support structure 110 carries a transparent eyeglass lens 150 (e.g., a prescription eyeglass lens, non-prescription eyeglass lens) and SMHC 130 comprises at least one layer of holographic material that is adhered to, affixed to, laminated with, carried in or upon, or otherwise integrated with eyeglass lens 150. The at least one layer of holographic material may include a holographic film, a photopolymer such as Bayfol®HX available from Bayer MaterialScience AG, and/or a silver halide compound and may, for example, be integrated with transparent lens 150 using any of the techniques described in U.S. Provisional Patent Application Ser. No. 62/214,600. As will be described in more detail later, the at least one layer of holographic material in SMHC 130 includes: i) a first holographic region positioned and oriented to receive a first range of light signals from SLP 120 and to converge the first range of light signals to a first exit pupil at or proximate the eye of the user; and ii) a second holographic region positioned and oriented to receive a second range of light signals from SLP 120 and to converge the second range of light signals to a second exit pupil at or proximate the eye of the user. Advantageously, the second holographic region is spatially-separated from the first holographic region at SMHC 130 and the second exit pupil may be spatially-separated from the first exit pupil at the eye of the user.

Generally, the first holographic region may include a first hologram that converges light to a first exit pupil and the second holographic region may include a second hologram that converges light to a second exit pupil. Depending on the specific implementation, the at least one layer of holographic material in SMHC 130 may comprise: a) a single continuous piece of holographic material that includes both the first holographic region (and its associated first hologram) and the spatially-separated second holographic region (and its associated second hologram) such that the first hologram and the second hologram are spatially-separated "localized" holograms that may be separately recorded into separate regions of the single continuous piece of holographic material, or b) a first piece of holographic material that includes the first holographic region and its associated first hologram and a second piece of holographic material that includes the second holographic region and its associated second hologram. In this latter scenario, SMHC 130 may include a substrate layer that carries both the first piece of holographic material and the second piece of holographic material. Furthermore, in some implementations, the at least one layer of holographic material in SMHC 130 may include any number of additional spatially-separated holographic regions, with each additional holographic region positioned and oriented to receive a respective range of light signals from SLP 120 and to converge the respective range of light signals to a respective exit pupil at or proximate the eye of the user. In this case, each additional holographic region is spatially-separated from the other holographic regions at SMHC 130 and each respective exit pupil may be spatially-separated from the other exit pupils at the eye of the user.

Figure 2:
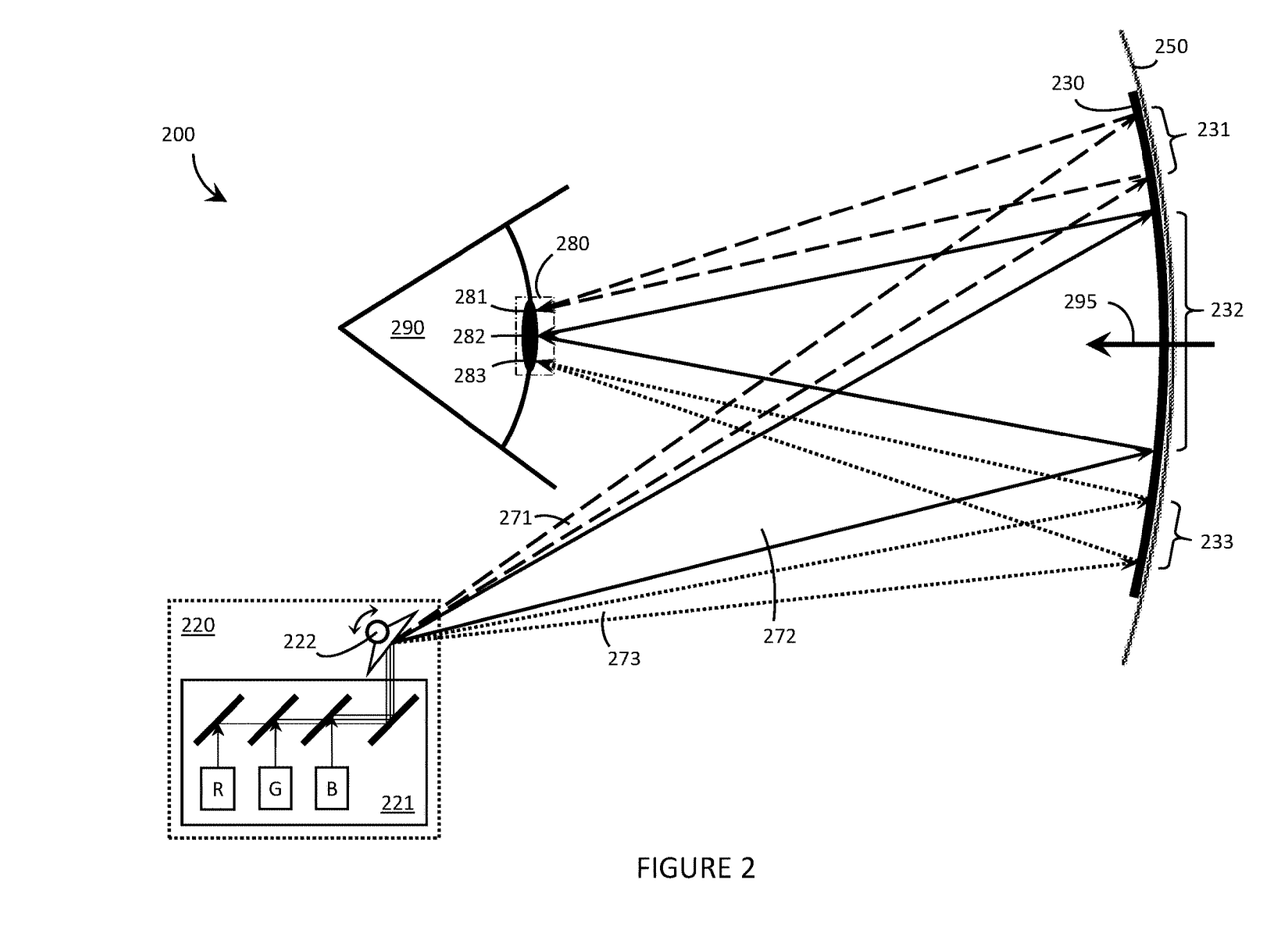
FIG. 2 is an illustrative diagram of a wearable heads-up display showing a spatially-multiplexed holographic combiner in operation for the purpose of providing multiple spatially-separated exit pupils at the eye of the user in accordance with the present systems, devices, and methods.

FIG. 2 is an illustrative diagram of a WHUD 200 showing a SMHC 230 in operation for the purpose of providing multiple spatially-separated exit pupils 281, 282, and 283 at the eye 290 of the user in accordance with the present systems, devices, and methods. WHUD 200 may be substantially similar to WHUD 100 from FIG. 1, although in FIG. 2 no support structure (e.g., support structure 110) is illustrated in order to reduce clutter. As with WHUD 100, WHUD 200 comprises a SLP 220 (which includes a RGB laser module 221 and at least one MEMS-based scan mirror 222) and SMHC 230 is carried by an eyeglass lens 250. As previously described, the combination of SMHC 230 and eyeglass lens 250 is sufficiently transparent to allow environmental light 295 to pass through to eye 290.

SMHC 230 includes a spatially-multiplexed HOE comprising at least one layer of holographic material with three spatially-separated holographic regions: a first holographic region 231, a second holographic region 232, and a third holographic region 233. For the purposes of the present systems, devices, and methods, a "spatially-multiplexed HOE" may or may not be transparent to certain wavelengths of light (e.g., to visible light having a wavelength or wavelengths that is/are not provided by SLP 220, such as most environmental light 295) while a SMHC, such as SMHC 230, includes a spatially-multiplexed HOE that is transparent to certain wavelength of light (e.g., to visible light having a wavelength or wavelengths that is/are not provided by SLP 220, such as most environmental light 295) in order to "combine" light from SLP 220 and environmental light 295 into a single field of view at eye 290.

SLP 220 is shown generating (e.g., projecting) three sets of light signals 271, 272, and 273 each over a respective sub-range of the total scan range of SLP 220. A first set of light signals 271 is represented by lines with large dashes and is incident on first holographic region 231 of SMHC 230, a second set of light signals 272 is represented by solid lines and is incident on second holographic region 232 of SMHC 230, and a third set of light signals 273 is represented by dotted lines and is incident on third holographic region 233 of SMHC 230. In accordance with the present systems, devices, and methods, each respective holographic region 231, 232, and 233 of SMHC 230 applies a respective optical function to the respective set of light signals 271, 272, and 273 that is incident thereon. In the illustrated example, first holographic region 231 applies a first optical function to first set of light signals 271 and the first optical function includes reflecting and converging first set of light signals 271 to a first focus and thereby providing a first exit pupil 281 at eye 290, second holographic region 232 applies a second optical function to second set of light signals 272 and the second optical function includes reflecting and converging second set of light signals 272 to a second focus and thereby providing a second exit pupil 282 at eye 290, and third holographic region 233 applies a third optical function to third set of light signals 273 and the third optical function includes reflecting and converging third set of light signals 273 to a third focus and thereby providing a third exit pupil 283 at eye 290.

First exit pupil 281, second exit pupil 282, and third exit pupil 283 are all spatially-separated at eye 290. In this way, the eyebox 280 of WHUD 200 may be expanded (relative to an eyebox having a single exit pupil) to encompass all three of exit pupils 281, 282, and 283. In the illustrated example, first holographic region 231 that converges first set of light signals 271 to first exit pupil 281 and third holographic region 233 that converges third set of light signals 273 to third exit pupil 283 are both smaller regions of SMHC 230 (at least with respect to the dimensions shown in FIG. 2) than second holographic region 232 that converges second set of light signals 272 to second exit pupil 282; however, because all three of holographic regions 231, 232, and 233 converge light signals to a respective exit pupil 281, 282, and 283 at eye 290, the first optical function applied by first holographic region 231 and the third optical function applied by third holographic region 233 both include converging the light from SLP 220 with a rate of convergence (e.g., a first rate of convergence) that is different from (in this case, less than) the rate of convergence (e.g., a second rate of convergence) with which second holographic region 232 of SMHC 230 converges the light from SLP 220.

In the illustrated example of WHUD 200, the respective optical functions applied by holographic regions 231, 232, and 233 all involve converging laser light from SLP 220 towards eye 290, but they are all different because each respective one of holographic regions 231, 232, and 233 converges light from SLP 220 from a different respective region in space to a different respective spatially-separated exit pupil 281, 282, and 283 at eye 290 (and in some cases with a different rate of convergence). In alternative implementations, not all of the optical functions applied by the different regions of an SMHC (or, more generally, of a spatially-multiplexed HOE) needs to necessarily include converging light. For example, in some implementations at least one holographic region of a spatially-multiplexed HOE may apply an optical function that includes collimating or diverging the light.

Figure 3:
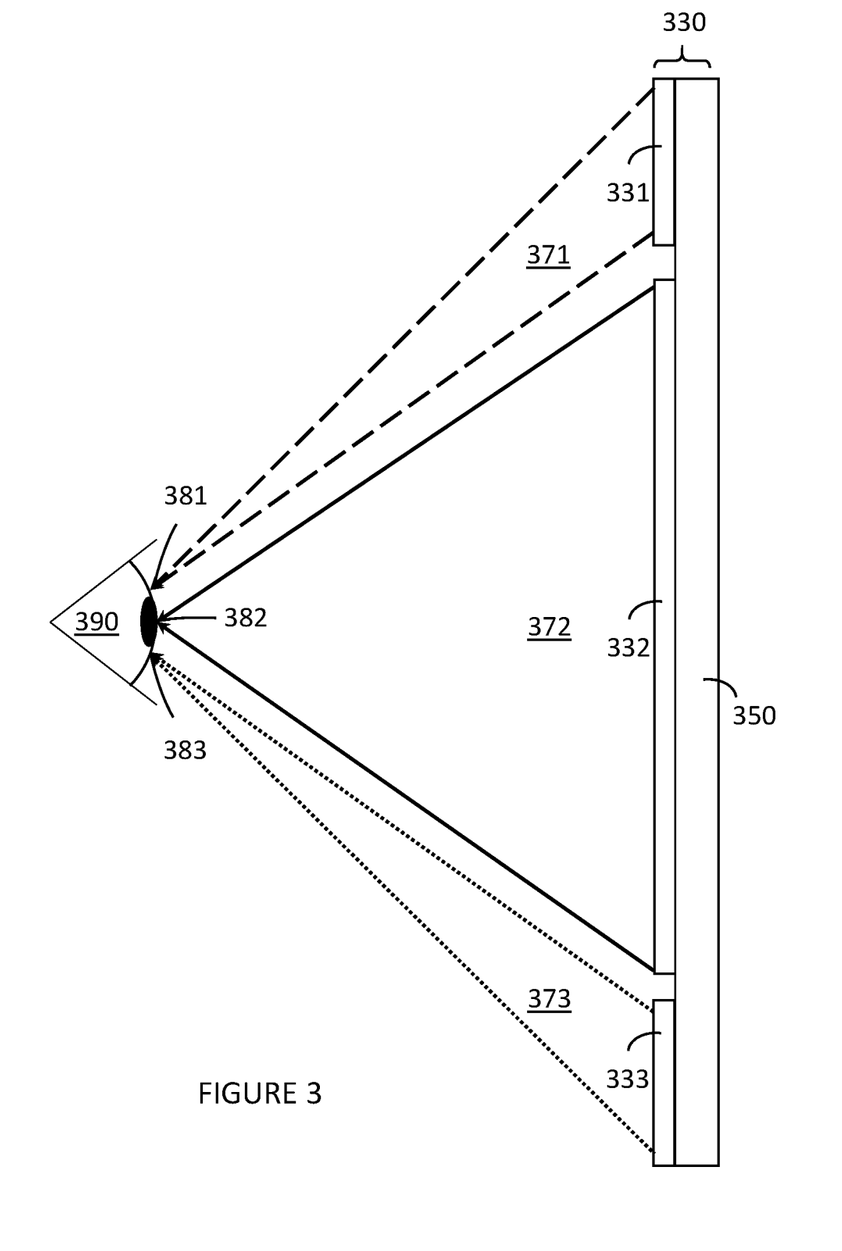
FIG. 3 is an illustrative diagram showing a simplified operation of a spatially-multiplexed holographic optical element in accordance with the present systems, devices, and methods.

FIG. 3 is an illustrative diagram showing a simplified operation of a spatially-multiplexed HOE 330 in accordance with the present systems, devices, and methods. Spatially-multiplexed HOE 330 is substantially similar to SMHC 230 from FIG. 2 but has been simplified to remove curvature and remove the other elements from WHUD 200. Thus, spatially-multiplexed HOE 330 includes three spatially-separated holographic regions 331, 332, and 333 each of which converges a respective set of light signals 371, 372, and 373 to a respective exit pupil 381, 382, and 383 at or proximate the eye 390 of a user. In the illustrated embodiment, each of holographic regions 331, 332, and 333 corresponds to a respective physically-separate piece of holographic material that includes a separate respective hologram. That is, first holographic region 331 corresponds to a first piece of holographic material that includes a first hologram, where the first hologram causes at least some light that is incident thereon to converge to first exit pupil 381; second holographic region 332 corresponds to a second piece of holographic material that includes a second hologram, where the second hologram causes at least some light that is incident thereon to converge to second exit pupil 382; and third holographic region 333 corresponds to a third piece of holographic material that includes a third hologram, where the third hologram causes at least some light that is incident thereon to converge to third exit pupil 383. All of the three holographic regions 331, 332, and 333 are carried by a common substrate layer 350, which may or may not be optically transparent and may or may not include an eyeglass lens. For the sake of simplicity, in FIG. 3 light signals 371, 372, and 373 are only shown being directed away from spatially-multiplexed HOE 330. Depending on the specific implementation, light signals 371, 372, and 373 may be incident on spatially-multiplexed HOE 330 from the same side as eye 390 and reflected and converged by holographic regions 331, 332, and 333, or light signals 371, 372, and 373 may be incident on spatially-multiplexed HOE 330 from the opposite side from eye 390 and transmitted and converged by holographic regions 331, 332, and 333.

As an alternative to each of holographic regions 331, 332, and 333 corresponding to a respective physically-separate piece of holographic material, multiple (e.g., three) holograms may be separately recorded at different regions of a single continuous piece of holographic material (i.e., "localized") such that each of holographic regions 331, 332, and 333 includes a respective hologram localized in or at a respective region of the single continuous piece of holographic material. Generally, the "holographic materials" described herein may include any or all of: holographic film, one or more silver halide compound(s), and/or one or more photopolymer(s) such as Bayfol®HX available from Bayer MaterialScience AG.

While spatially-multiplexed HOE 330 in FIG. 3 includes three spatially-separated holographic regions 331, 332, and 333, each of which applies a respective optical function to at least some light that is incident thereon, in alternative implementations any number of holographic regions may be employed. For example, some implementations may include at least one additional holographic region that is spatially-separated from the other holographic regions, where each additional holographic region applies a different respective optical function to at least some light that is incident thereon. Generally, when a spatially-multiplexed HOE is a planar or curved surface, spatially-separated holographic regions may correspond to different regions on that surface. However, some implementations may employ multiple holographic surfaces (in-plane and/or out-of-plane with respect to one another) and at least some different spatially-separated regions may be included on different holographic surfaces.

Figure 4:
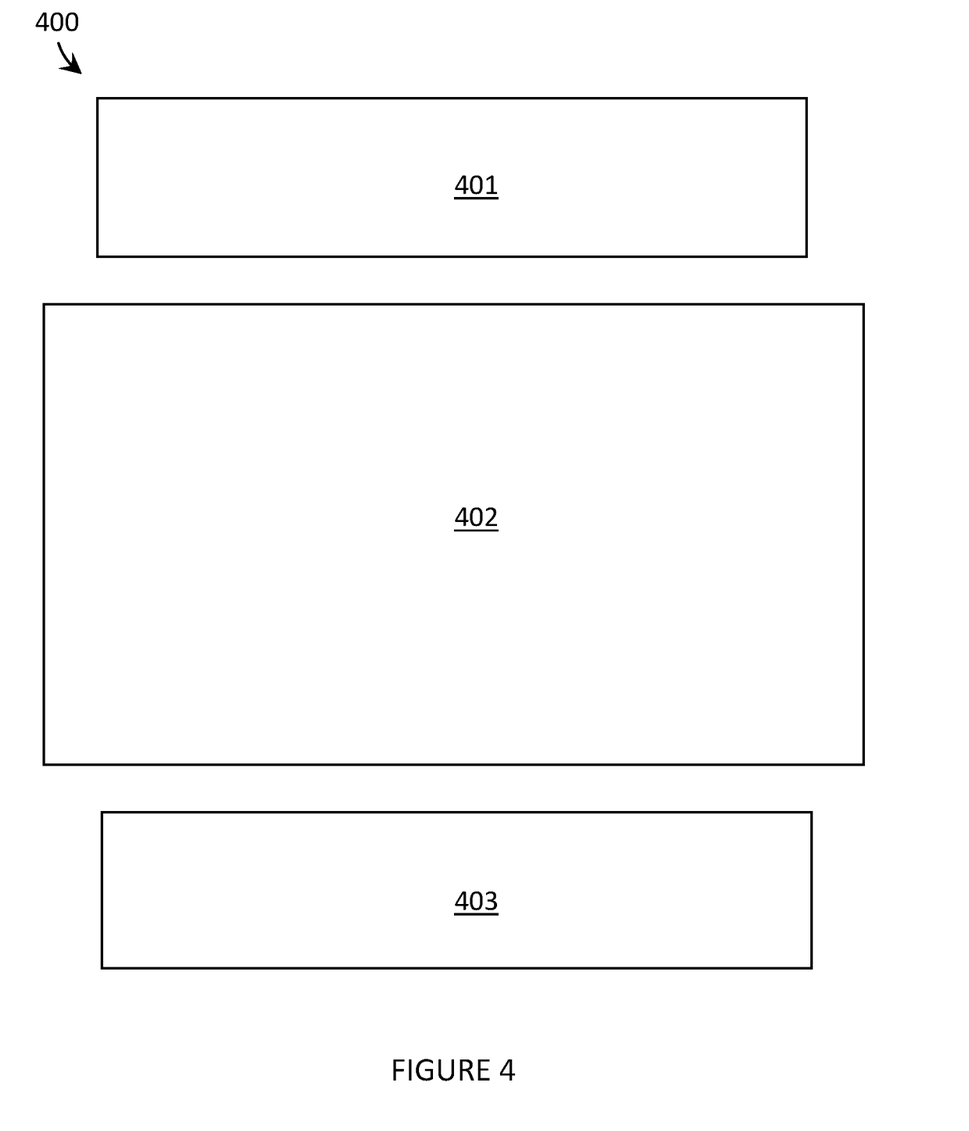
FIG. 4 is an illustrative diagram showing a representation of displayed content in the field of view of a user of the wearable heads-up display from FIG. 2 in accordance with the present systems, devices, and methods.

FIG. 4 is an illustrative diagram showing a representation of displayed content 400 in the field of view of a user of WHUD 200 from FIG. 2 (i.e., a field of view of eye 290) in accordance with the present systems, devices, and methods. Since spatially-multiplexed HOE 330 from FIG. 3 is substantially similar to a simplified version of SMHC 230 (e.g., SMHC 230 with at least the curvature removed), FIG. 4 also provides a representation of content in the field of view of eye 390 from FIG. 3.

SMHC 230 in WHUD 200 includes three spatially-separated holographic regions 231, 232, and 233 each of which converges light from SLP 220 to a respective one of three spatially-separated exit pupils 281, 282, and 283 at eye 290. Accordingly, the displayed content depicted in FIG. 4 shows three spatially-separated display regions 401, 402, and 403 in the field of view of the user. Each of display regions 401, 402, and 403 corresponds to a respective one of exit pupils 281, 282, and 283 and stems from a respective one of holographic regions 231, 232, and 233 of SMHC 230. Generally, a user may be able to see any displayed content corresponding to an exit pupil that is impingent on (i.e., overlaps with) the pupil of the user's eye 290; thus, the spatial separation of exit pupils 281, 282, and 283 at eye 290 and the size of the pupil of eye 290 determine whether a user is able to see all three of display regions 401, 402, and 403 concurrently or whether the user is only able to see some fraction of any or all of display regions 401, 402, and 403 at any given time (i.e., at any given eye position) and must move the gaze direction of eye 290 in order to see all of display regions 401, 402, and 403.

Display regions 401, 402, and 403 are not homogeneous and they do not overlap. In alternative implementations, display regions 401, 402, and 403 may be homogeneous and/or they may overlap; however, generally, because spatial multiplexing employs different spatially-separated holographic regions to selectively apply different optical functions (e.g., convergence to different exit pupils) to light from a light source, the light that is directed towards the eye of the user from any particular one of the spatially-separated holographic regions may appear in a particular region of the user's field of view that is dependent on the spatial position of the holographic region in relation to the user's eye. In this way, spatial-multiplexing may be to engineer the layout of a virtual user interface that is displayed to a user of WHUD 200. For example, in the user interface corresponding to displayed content 400, display regions 401 and 403 may be used to display application icons and notifications (like the taskbar in conventional computer interfaces) while display region 402 may be used to display content of any active application.

In some applications, such as in applications where different display regions (401, 402, and 403) have different shapes and/or sizes like in display content 400, it may be advantageous for a WHUD to employ an eyebox that comprises heterogeneous exit pupils as described in U.S. Provisional Patent Application Ser. No. 62/156,736. Such can help to engineer the position of each display region in the user's field of view and also to control the range of eye positions of which a display region is visible. For example, a display region that is devoted to notifications, such as for example display region 401, may advantageously employ a large exit pupil in order to remain visible to the user over a wide range of eye positions.

While FIG. 4 depicts display content 400 comprising two horizontally-elongated rectangular display regions 401, 403 flanking or sandwiching a broader central display region 402, the present systems, devices, and methods may be employed to engineer any number and layout of display regions depending on the specific implementation. For example, when a SMHC is positioned to fill up most of the field of view of an eye of a user as in WHUD 200, the field of view of the user may be divided, parceled, tiled, or generally separated into any number of separate display regions each having any geometry that may be desirable for the particular application.

Figure 5:
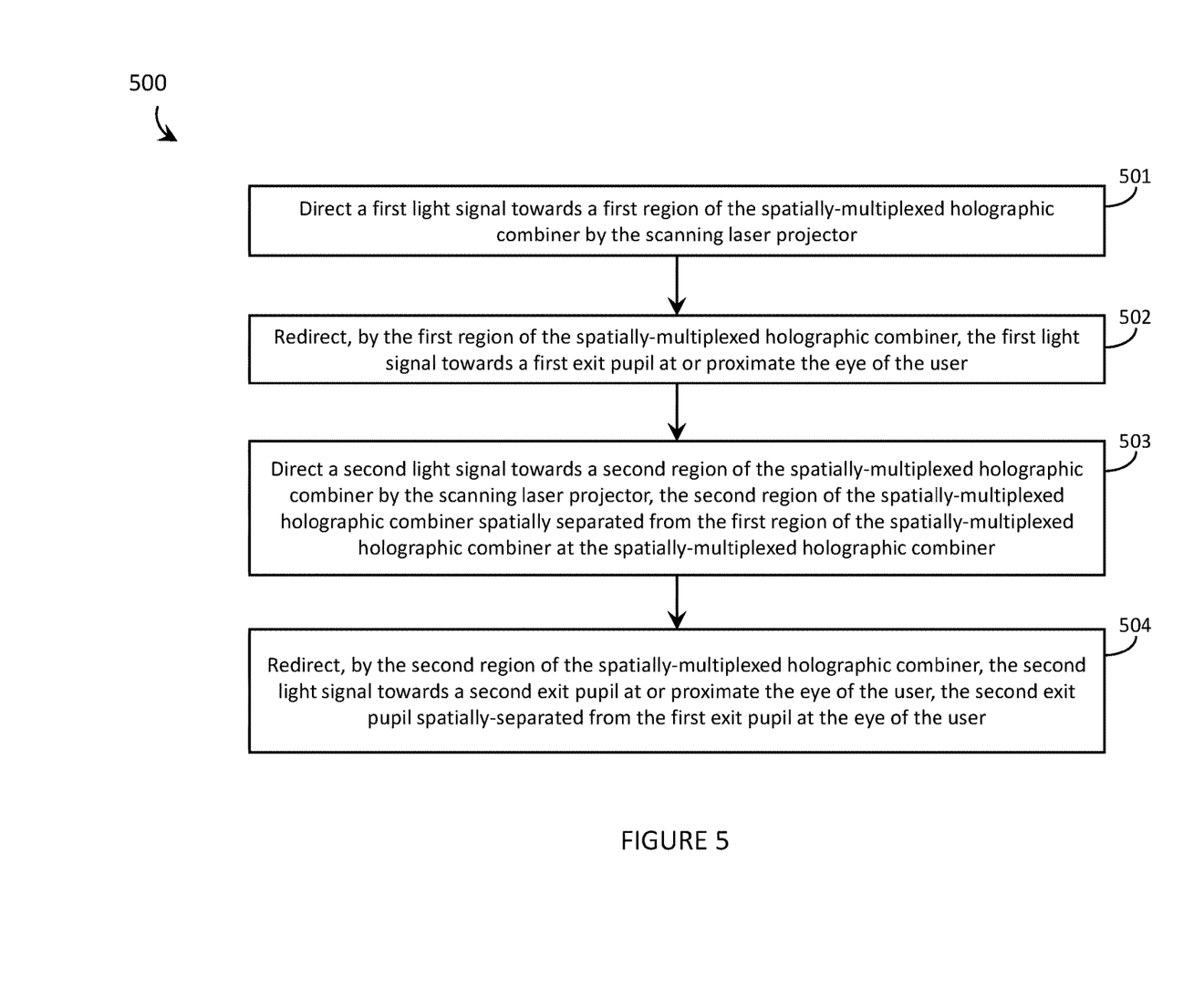
FIG. 5 is a flow-diagram showing a method of operating a wearable heads-up display in accordance with the present systems, devices, and methods.

FIG. 5 is a flow-diagram showing a method 500 of operating a WHUD in accordance with the present systems, devices, and methods. The WHUD may be substantially similar to WHUD 100 or WHUD 200 and generally includes a SLP and a SMHC. Method 500 includes four acts 501, 502, 503, and 504, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 500, the term "user" refers to a person that is wearing the WHUD.

At 501, the SLP directs a first light signal towards a first region of the SMHC. The first light signal may correspond to all or a portion of an image, such as one or more pixel(s) of an image. The image may include any visual representation of data, including a photograph, a drawing, text, a chart or graph, a picture, a video (e.g., a still or frame from a video or animation), and so on.

At 502, the first region of the SMHC redirects the first light signal towards a first exit pupil at or proximate the eye of the user. In some implementations, the first region of the SMHC may redirect the first light signal by reflecting and/or converging the first light signal towards the first exit pupil at or proximate the eye of the user.

At 503, the SLP directs a second light toward a second region of the SMHC, the second region of the SMHC being spatially-separated from the first region of the SMHC from act 501. The second light signal may correspond to all or a different portion of the same image as the first light signal from act 501, or the second light signal may correspond to all or a portion of a second image that is different from the image to which the first light signal from act 501 corresponds.

At 504, the second region of the SMHC redirects the second light signal towards a second exit pupil at or proximate the eye of the user, the second exit pupil being spatially-separated from the first exit pupil at or proximate the eye of the user. In some implementations, the second region of the SMHC may redirect the second light signal by reflecting and/or converging the second light signal towards the second exit pupil at or proximate the eye of the user.

In some implementations, method 500 may be extended by having the SLP direct additional light signals to the first and/or second region of the SMHC and the SMHC redirecting such additional light signals towards the first and/or second exit pupil. Method 500 may also be extended by having the SLP direct at least one additional light signal towards the SMHC, where each additional light signal is directed towards a respective spatially-separated region of the SMHC and each respective spatially-separated region of the SMHC directs each additional light signal towards a respective spatially-separated exit pupil at or proximate the eye of the user.

In architectures that achieve eyebox expansion by using spatial multiplexing to replicate an exit pupil, the area of the SMHC may be tiled or otherwise divided (e.g., interlaced) into multiple regions, where each region projects nominally the same image content to a different exit pupil located at a different position on the user's eye. The tradeoff is that each region of the SMHC is necessarily smaller than the total area of the SMHC, and as a result projects an image having a narrower field of view and/or resolution than what would be possible if the entire area of the SMHC were used for a single exit pupil. The area of a SMHC may be tiled, interlaced, or generally divided up into any number of regions to produce any number of exit pupils. The resulting exit pupils may be engineered to interact in a wide variety of different ways. For example, the exit pupils may all be physically separated from one another, respective portions of two or more exit pupils may overlap, the entirety of one exit pupil may be included within another exit pupil, and so on. The specific exit pupil arrangement used depends on the content being displayed, the interface therefor, and other details of the specific implementation.

A person of skill in the art will appreciate that the term "wavelength" is used loosely herein to refer to a relatively narrow (e.g., within 10% or 15%) waveband of light, as most "single wavelength" laser diodes generally provide light signals over such a narrow waveband.

The spatially-multiplexed HOEs described herein may generally be substantially flat or planar in geometry or, as illustrated in FIG. 2, may embody some curvature. In some implementations, an SMHC (e.g., SMHC 230) may embody curvature because the SMHC is carried by a prescription eyeglass lens (e.g., 250) that has some curvature. When necessary, an SMHC may include systems, devices, and/or methods for curved holographic optical elements described in U.S. Provisional Patent Application Ser. No. 62/268,892.

The various embodiments described herein provide systems, devices, and methods for spatial multiplexing in scanning laser-based WHUDs. Each multiplexed exit pupil is aligned to a respective spatially-separated position at or proximate the eye of the user because the SMHC selectively routes the light signals along spatially-separated optical paths. The effect is substantially the same as if multiple SLPs and/or multiple holographic combiners were used instead of the SMHC, however, the use of the SMHC has considerable advantages in terms of power savings and minimizing hardware bulk.

A person of skill in the art will appreciate that the present systems, devices, and methods may be applied or otherwise incorporated into WHUD architectures that employ one or more light source(s) other than a SLP. For example, in some implementations the SLP described herein may be replaced by another light source, such as a light source comprising one or more light-emitting diodes ("LEDs"), one or more organic LEDs ("OLEDs"), one or more digital light processors ("DLPs"). Such non-laser implementations may advantageously employ additional optics to collimate, focus, and/or otherwise direct projected light signals. Unless the specific context requires otherwise, a person of skill in the art will appreciate that references to a "SLP" throughout the present systems, devices, and methods are generic to other light sources (combined with other optics, as necessary) that may be applied or adapted for application to accomplish the same general function(s) associated with the SLPs described herein.

A person of skill in the art will appreciate that the various embodiments for spatial multiplexing described herein may be applied in non-WHUD applications. For example, the present systems, devices, and methods may be applied in non-wearable heads-up displays and/or in other projection displays, including virtual reality displays, in which the holographic combiner need not necessarily be transparent.

In some implementations that employ multiple exit pupils, all exit pupils may optionally be active at all times (allowing for temporal separation). Alternatively, some WHUD implementations may employ eye-tracking to determine the particular display region(s) towards which the user is gazing and may activate only the exit pupil(s) that correspond(s) to where the user is looking while one or more exit pupil(s) that is/are outside of the user's field of view may be deactivated. An eye tracker included in any of the implementations of WHUDs described herein may employ any of a variety of different eye tracking technologies depending on the specific implementation. For example, an eye tracker may employ any or all of the systems, devices, and methods described in U.S. Provisional Patent Application Ser. No. 62/167,767; U.S. Provisional Patent Application Ser. No. 62/271,135; U.S. Provisional Patent Application Ser. No. 62/245,792; and/or U.S. Provisional Patent Application Ser. No. 62/281,041.

Multiplexed exit pupils may advantageously enable a user to see displayed content while gazing in a wide range of directions. Furthermore, multiplexed exit pupils may also enable a wider variety of users having a wider range of eye arrangements to adequately see displayed content via a given WHUD. Anatomical details such as interpupillary distance, eye shape, relative eye positions, and so on can all vary from user to user. The various exit pupil multiplexing methods described herein may be used to render a WHUD more robust over (and therefore more usable by) a wide variety of users having anatomical differences. In order to even further accommodate physical variations from user to user, the various WHUDs described herein may include one or more mechanical structure(s) that enable the user to controllably adjust the physical position and/or alignment of one or more exit pupil(s) relative to their own eye(s). Such mechanical structures may include one or more hinge(s), dial(s), flexure(s), tongue and groove or other slidably-coupled components, and the like. For example, at least one of the SLP and/or the optical splitter may be physically movable and/or rotatable on the support structure and the user may physically move and/or rotate the SLP and/or the optical splitter to change a position of at least one of the N exit pupils relative to the eye. Alternatively, the approaches taught herein may advantageously avoid the need for inclusion of such additional mechanical structures, allowing a smaller package and less weight than might otherwise be obtainable.

In some implementations, one or more optical fiber(s) may be used to guide light signals along some of the paths illustrated herein.

The various implementations described herein may, optionally, employ the systems, devices, and methods for preventing eyebox degradation described in U.S. Provisional Patent Application Ser. No. 62/288,947.

The WHUDs described herein may include one or more sensor(s) (e.g., microphone, camera, thermometer, compass, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060.

The various implementations of WHUDs described herein may include any or all of the technologies described in U.S. Provisional Patent Application Ser. No. 62/242,844.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/156,736, U.S. Non-Provisional patent application Ser. No. 15/046,234, U.S. Non-Provisional patent application Ser. No. 15/046,254, U.S. Non-Provisional patent application Ser. No. 15/046,269, U.S. Provisional Patent Application Ser. No. 62/322,128, U.S. Provisional Patent Application Ser. No. 62/214,600, U.S. Provisional Patent Application Ser. No. 62/268,892, U.S. Provisional Patent Application Ser. No. 62/167,767, U.S. Provisional Patent Application Ser. No. 62/271,135, U.S. Provisional Patent Application Ser. No. 62/245,792, U.S. Provisional Patent Application Ser. No. 62/281,041, U.S. Non-Provisional patent application Ser. No. 62/288,947, U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, and/or U.S. Provisional Patent Application Ser. No. 62/242,844, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A spatially-multiplexed holographic optical element ("HOE") for use in a display having multiple exit pupils, wherein the spatially-multiplexed HOE includes at least one layer of holographic material and that at least one layer of holographic material comprises:
   a first holographic region including a first hologram to receive light from a light source, apply a first optical function thereto, and converge the light towards a first exit pupil with the first optical function applied thereto; and
   a second holographic region including a second hologram to receive light from the light source, apply a second optical function thereto, the second optical function different from the first optical function, and diverge the light towards a second exit pupil with the second optical function applied thereto, wherein:
   the second holographic region is a closest neighbor holographic region to the first holographic region and spatially-separated from the first holographic region; and
   the second exit pupil is spatially-separated from the first exit pupil.

2. The spatially-multiplexed HOE of claim 1 wherein both the first optical function and the second optical function reflect the light from the light source.

3. The spatially-multiplexed HOE of claim 1 wherein the at least one layer of holographic material comprises a first continuous piece of holographic material that includes both the first holographic region and the second holographic region, and wherein the first hologram is in the first holographic region of the first continuous piece of holographic material and the second hologram is in the second holographic region of the first continuous piece of holographic material.

4. The spatially-multiplexed HOE of claim 1 wherein the at least one layer of holographic material comprises:
   a first piece of holographic material that includes the first holographic region and wherein the first hologram is in the first holographic region of the first piece of holographic material; and
   a second piece of holographic material that includes the second holographic region and wherein the second hologram is in the second holographic region of the second piece of holographic material.

5. The spatially-multiplexed HOE of claim 4, further comprising a substrate layer that carries both the first piece of holographic material and the second piece of holographic material.

6. The spatially-multiplexed HOE of claim 1 wherein the at least one layer of holographic material includes a holographic material selected from a group consisting of: a silver halide compound, a photopolymer, and a combination of a silver halide compound and a photopolymer.

7. The spatially-multiplexed HOE of claim 1 wherein the at least one layer of holographic material further comprises:
   at least one additional holographic region to receive light from the light source, each additional holographic region to apply a respective optical function to light received from the light source and direct the light towards a respective exit pupil, wherein:
   each additional holographic region is spatially-separated from the other holographic regions; and
   each exit pupil is spatially-separated from the other exit pupils.

8. The spatially-multiplexed HOE of claim 1 wherein the first holographic region and the second holographic region are both substantially transparent to visible light having a wavelength that is not a wavelength of light provided by the light source.

9. The spatially multiplexed HOE of claim 1 wherein the first holographic region is spatially separated from the second holographic region by a distance greater than zero.

10. The spatially multiplexed HOE of claim 1, the first holographic region to converge light representing at least a portion of an image to be displayed towards the first exit pupil with the first optical function applied thereto, and the second holographic region to diverge light representing the same at least a portion of the image to be displayed towards the second exit pupil with the second optical function applied thereto.

11. A wearable heads-up display ("WHUD") comprising:
   a support structure that in use is worn on a head of a user;
   a scanning laser projector carried by the support structure; and
   a spatially-multiplexed holographic combiner carried by the support structure, wherein the spatially-multiplexed holographic combiner is positioned within a field of view of an eye of the user when the support structure is worn on the head of the user, and wherein the spatially-multiplexed holographic combiner comprises at least one layer of holographic material, the at least one layer of holographic material including:
   a first holographic region including a first hologram positioned and oriented to receive a first range of light signals from the scanning laser projector and to converge the first range of light signals to a first exit pupil at or proximate the eye of the user; and
   a second holographic region including a second hologram positioned and oriented to receive a second range of light signals from the scanning laser projector and to diverge the second range of light signals to a second exit pupil at or proximate the eye of the user, wherein the second holographic region is a closest neighbor holographic region to the first holographic region and spatially-separated from the first holographic region at the spatially-multiplexed holographic combiner and the second exit pupil is spatially-separated from the first exit pupil at the eye of the user.

12. The WHUD of claim 11 wherein the support structure has a general shape and appearance of an eyeglasses frame, and wherein the spatially-multiplexed holographic combiner further comprises an eyeglass lens that carries the at least one layer of holographic material.

13. The WHUD of claim 11 wherein the at least one layer of holographic material in the spatially-multiplexed holographic combiner comprises a first continuous piece of holographic material that includes both the first holographic region and the second holographic region, and wherein the first hologram is in the first holographic region of the first continuous piece of holographic material and the second hologram is in the second holographic region of the first continuous piece of holographic material.

14. The WHUD of claim 11 wherein the at least one layer of holographic material in the spatially-multiplexed holographic combiner comprises:
   a first piece of holographic material that includes the first holographic region, wherein the first hologram is in the first holographic region of the first piece of holographic material; and
   a second piece of holographic material that includes the second holographic region, wherein the second hologram is in the second holographic region of the second piece of holographic material.

15. The WHUD of claim 11 wherein the at least one layer of holographic material in the spatially-multiplexed holographic combiner further includes:
   at least one additional holographic region, each additional holographic region positioned and oriented to receive a respective range of light signals from the scanning laser projector and to converge the respective range of light signals to a respective exit pupil at or proximate the eye of the user, wherein each additional holographic region is spatially-separated from the other holographic regions at the spatially-multiplexed holographic combiner and each respective exit pupil is spatially-separated from the other exit pupils at the eye of the user.

16. The WHUD of claim 11 wherein the first holographic region is spatially separated from the second holographic region by a distance greater than zero.

17. The WHUD of claim 11, the first holographic region to converge the first range of light signals representing at least a portion of an image to be displayed towards the first exit pupil, and the second holographic region to diverge the second range of light signals representing the same at least a portion of the image to be displayed towards the second exit pupil.

18. A method of operating a wearable heads-up display ("WHUD"), the WHUD including a scanning laser projector and a spatially-multiplexed holographic combiner positioned within a field of view of an eye of a user when the WHUD is worn on a head of the user, the method comprising:
   directing a first light signal towards a first region of the spatially-multiplexed holographic combiner including a first hologram by the scanning laser projector;
   converging, by the first region of the spatially-multiplexed holographic combiner including the first hologram, the first light signal towards a first exit pupil at or proximate the eye of the user;
   directing a second light signal towards a second region of the spatially-multiplexed holographic combiner including a second hologram by the scanning laser projector, the second region of the spatially-multiplexed holographic combiner including the second hologram being a closest neighboring hologram to and spatially separated from the first region of the spatially-multiplexed holographic combiner including the first hologram at the spatially-multiplexed holographic combiner; and
   diverging, by the second region of the spatially-multiplexed holographic combiner including the second hologram, the second light signal towards a second exit pupil at or proximate the eye of the user, the second exit pupil spatially-separated from the first exit pupil at the eye of the user.

19. The method of claim 18, further comprising:
   directing at least one additional light signal towards the spatially-multiplexed holographic combiner by the scanning laser projector, each additional light signal being directed towards a respective spatially-separated region of the spatially-multiplexed holographic combiner by the scanning laser projector; and redirecting, by each respective spatially-separated region of the spatially-multiplexed holographic combiner, each additional light signal towards a respective a respective spatially-separated exit pupil at or proximate the eye of the user.

20. The method of claim 18 wherein:

converging, by the first region of the spatially-multiplexed holographic combiner including the first hologram, the first light signal towards a first exit pupil at or proximate the eye of the user comprises converging, by the first region of the spatially-multiplexed holographic combiner including the first hologram, the first light signal representing at least a portion of an image to be displayed towards the first exit pupil at or proximate the eye of the user; and diverging, by the second region of the spatially-multiplexed holographic combiner including the second hologram, the second light signal towards a second exit pupil at or proximate the eye of the user comprises diverging, by the second region of the spatially-multiplexed holographic combiner including the second hologram, the second light signal representing the same at least a portion of the image to be displayed towards the second exit pupil at or proximate the eye of the user.

* * * * *